(12) United States Patent
Wei et al.

(10) Patent No.: US 11,622,502 B2
(45) Date of Patent: Apr. 11, 2023

(54) PUSH ROD MECHANISM FOR GARDEN TOOL, GARDEN TOOL, AND METHOD FOR USING GARDEN TOOL

(71) Applicant: SKYBEST ELECTRIC APPLIANCE (SUZHOU) CO., LTD., Suzhou (CN)

(72) Inventors: Juan Wei, Suzhou (CN); Tianrong Zhang, Suzhou (CN)

(73) Assignee: Skybest Electric Appliance (Suzhou) Co., Ltd., Suzhou (CN)

( * ) Notice: Subject to any disclaimer, the term of this patent is extended or adjusted under 35 U.S.C. 154(b) by 849 days.

(21) Appl. No.: 16/475,408

(22) PCT Filed: Dec. 26, 2017

(86) PCT No.: PCT/CN2017/118519
§ 371 (c)(1),
(2) Date: Jul. 2, 2019

(87) PCT Pub. No.: WO2018/126942
PCT Pub. Date: Jul. 12, 2018

(65) Prior Publication Data
US 2020/0000030 A1 Jan. 2, 2020

(30) Foreign Application Priority Data
Jan. 3, 2017 (CN) .......................... 201710002193.8

(51) Int. Cl.
*A01D 34/82* (2006.01)
*F16C 11/10* (2006.01)
(Continued)

(52) U.S. Cl.
CPC ............ *A01D 34/824* (2013.01); *F16C 11/10* (2013.01); *A01D 34/68* (2013.01); *A01D 2101/00* (2013.01)

(58) Field of Classification Search
CPC ... F16C 11/10; A01D 34/824; A01D 2101/00; A01D 34/68; A01D 75/18; A01D 34/00;
(Continued)

(56) References Cited

U.S. PATENT DOCUMENTS 2,786,694 A * 3/1957 Gray .................... A01D 34/824
403/93
3,481,123 A * 12/1969 Lessig .................. B62D 51/001
280/47.36
(Continued)

FOREIGN PATENT DOCUMENTS

CN 203327538 U 12/2013
CN 104025798 A * 9/2014 ............. A01D 34/67
(Continued)

OTHER PUBLICATIONS

Search Report for International Application No. PCT/CN2017/118519, dated Mar. 29, 2018.

*Primary Examiner* — Arpad F Kovacs
(74) *Attorney, Agent, or Firm* — JK Intellectual Property Law, PA

(57) ABSTRACT

A rod mechanism for a garden tool having a main body includes a first rod pivotally connected to the main body and movable between an in-use position and a storage position. A locking component engages the main body to lock the first rod in one of the in-use position and the storage position. An actuator moves between a released position and a triggered position, the actuator when in the triggered position unlocking the locking component from the main body, the actuator when in the released position orienting the locking component so as to be lockable to the main body. A second rod connected to the first rod moves to a preset position allowing the actuator to move to one of the triggered position or the released position. A position sensor on the main body
(Continued)

generates a sensing signal when the first rod pivots to at least one of the in-use position and the storage position.

11 Claims, 4 Drawing Sheets

(51) Int. Cl.
*A01D 34/68* (2006.01)
*A01D 101/00* (2006.01)

(58) Field of Classification Search
CPC ........ A01D 34/67; B62D 51/001; B62B 9/26; B62B 7/08; B62B 5/064
See application file for complete search history.

(56) References Cited

U.S. PATENT DOCUMENTS

| | | | | |
|---|---|---|---|---|
| 3,764,156 A * | 10/1973 | Nepper | ............... | A01D 34/824 56/DIG. 18 |
| 4,561,239 A * | 12/1985 | Cook | .................. | A01D 34/824 56/DIG. 18 |
| 5,163,275 A * | 11/1992 | Hare | .................... | A01D 34/824 56/DIG. 18 |
| 5,636,504 A * | 6/1997 | Kaley | .................. | A01D 34/001 56/DIG. 18 |
| 5,645,293 A * | 7/1997 | Cheng | ...................... | B62B 9/26 280/658 |
| 6,073,945 A * | 6/2000 | Cheng | ...................... | B62B 9/20 403/93 |
| 7,231,755 B2 * | 6/2007 | Clarke | .................. | A01D 34/824 56/14.7 |
| 8,419,025 B2 * | 4/2013 | Chen | ........................ | B62B 7/10 280/47.38 |
| 8,713,761 B2 * | 5/2014 | Grewe | ................. | A01D 34/824 16/437 |
| 9,038,356 B2 * | 5/2015 | Shao | .................... | A01D 34/824 56/16.7 |
| 9,386,743 B2 * | 7/2016 | Baker | .................... | A01D 34/71 |
| 9,491,907 B2 * | 11/2016 | Edholm | ............... | A01D 34/824 |
| 2008/0256919 A1 | 10/2008 | Schreiner | | |
| 2014/0102063 A1 * | 4/2014 | Yamaoka | ............... | H01H 15/10 200/539 |
| 2014/0102064 A1 * | 4/2014 | Yamaoka | ............... | A01D 69/08 56/10.5 |
| 2015/0101301 A1 * | 4/2015 | Yamaoka | ............... | A01D 34/67 56/10.8 |

FOREIGN PATENT DOCUMENTS

| | | | | |
|---|---|---|---|---|
| CN | 106211933 A | 12/2016 | | |
| CN | 104584762 A | 1/2017 | | |
| CN | 106818024 A | 6/2017 | | |
| CN | 206461972 U | 9/2017 | | |
| CN | 108781713 A * | 11/2018 | ............. | A01D 34/68 |
| EP | 3766328 A1 * | 1/2021 | ............. | A01D 34/00 |
| ES | 2310788 T3 * | 1/2009 | ............ | A01D 34/824 |

* cited by examiner

PUSH ROD MECHANISM FOR GARDEN TOOL, GARDEN TOOL, AND METHOD FOR USING GARDEN TOOL

CROSS-REFERENCE TO RELATED APPLICATIONS

This application is a national stage of International Application No. PCT/CN2017/118519, filed Dec. 26, 2017, and claims benefit to Chinese Patent Application No. 201710002193.8, filed Jan. 3, 2017, both of which are incorporated by reference herein.

TECHNICAL FIELD

The present disclosure relates to a rod mechanism for a garden tool and the garden tool with the mechanism.

BACKGROUND

Walk-behind lawn mowers or handcarts are configured with rods for pushing. This kind of rod usually comprises a first rod connected to two sides of a main body of a lawn mower or handcart and a second rod connected with a rod base. The second rod is configured with a grip portion for pushing while the lawn mower or handcart in operation.

Take a lawn mower as an example, when the lawn mower is in a work condition, the rod connected to the main body of the lawn mower extends toward the back of the lawn mower for a certain length, for an operator to work at a safe distance of a certain length away from a cutting tool. While the lawn mower is not in the work condition, it needs to be stored. A releasable locking mechanism is normally provided on an upper rod of the main body and the rod base of the lawn mower, respectively, to release the upper rod from the rod base when the lawn mower is stored, and then fold the upper rod and the rod base to reduce the stored volume. The locking mechanism usually rotatably locks the upper rod using a locking nut. The operation of this type of locking component is relatively complex and time consuming.

An existing lawn mower comprises a lawn mower main body, a rod base fixed to the lawn mower main body, a lower rod connected to the rod base, and an upper rod connected with the lower rod. A second locking component is provided between the lower rod and the rod base to enable the lock/unlock of the lower rod with respect to the rod base. This kind of locking component is complicated in design, increases the product size, and is inconvenient for packaging.

SUMMARY

An object of the present disclosure is to solve the problems of the prior art, and to provide a rod mechanism for a garden tool and the garden tool comprising a mechanism with a simple structure and a convenient prototype packaging. The unlock of the locking component may be realized by pressing the rod, thereby realizing post-folding limit of the rod.

A technical solution of the present disclosure includes a rod mechanism for a garden tool comprises a first rod pivotally connected to the main body of the garden tool and lockable at least in the in-use position or in the storage position. The first rod has an actuator and a locking component. The locking component is unlocked from the main body of the garden tool by triggering the actuator, and the locking component is locked up with the garden tool main body by releasing the actuator. The rod mechanism also includes a second rod movably connected with the first rod. While the second rod moves to a preset position, the actuator may be triggered or released. The main body of the garden tool has a position sensor, which is configured to generate a sensing signal when the first rod rotates to the in-use position and/or the storage position.

Further, in the above-described rod mechanism for the garden tool, wherein the second rod may be driven to retract into the first rod and trigger or release the actuator while being driven to retract into the first rod.

Further, in the above-described rod mechanism for the garden tool, the actuator comprises an elastic member and a sliding member. The elastic member is connected to a lower end of the sliding member for the sliding member to have an upwardly moving tendency. One end of the locking component is connected with the sliding member, the other end of the locking component extends toward the main body of the garden tool, and the second rod abuts against an upper end of the sliding member when being driven to retract into the first rod.

Further, in the above-described rod mechanism for the garden tool, the locking component is a pin, and the pin extends through the sliding member and toward the main body of the garden tool.

Further, in the above-described rod mechanism for the garden tool, the actuator comprises an elastic member and a sliding member. One end of the locking component is connected with the sliding member, the other end of the locking component extends toward the main body of the garden tool. The first rod has a baffle. The baffle is located below the locking component, and the elastic member is connected between the locking component and the baffle for the locking component to have an upward moving tendency.

Further, in the above-described rod mechanism for the garden tool, the main body of the garden tool has a guiding groove along the rotation direction of the first rod. The guiding groove comprises a guiding portion and at least two locking sections communicating with the guiding portion. The end of the locking component extending toward the main body of the garden tool extends inside the guiding groove, and is restricted in the locking section when the locking component in the lock engagement state and enters the guiding portion from the locking section when the locking component out of the lock engagement state. The first locking section of the two locking sections is located at the head end of the guiding groove, and the second locking section of the two locking sections is located at the terminal end of the guiding groove.

Further, in the above-described rod mechanism for the garden tool, the guiding groove includes a third locking section positioned between the first locking section and the second locking section. Preferably, the above-described rod mechanism for the garden tool, wherein the position sensor is a micro switch, and the first rod has a convex block. When the first rod rotates to the in-use position and/or the storage position, the pressing engagement of the convex block and the micro switch triggers the micro switch to generate the sensing signal.

Preferably, in the above-described rod mechanism for the garden tool, the micro switch includes a switch body, a lever and a contact. The lever and the contact are located at an interval on the switch body. When the first rod rotates to the in-use position, the convex block engages with the lever and presses the lever to deform so as to the lever engage with the contact. The sensing signal is generated when the lever and the contact are engaged.

The present disclosure also includes a garden tool comprising the above-described rod mechanism.

The present disclosure also includes a use method of the above-described garden tool, comprises the following steps: when in the in-use position, driving the second rod to retract into the first rod until contacting with and triggering the actuator to release the lock engagement of the locking component and the main body of the garden tool; operating the first rod to rotate to the storage position; releasing the second rod to release the actuator, to enable the lock engagement of the locking component and the main body of the garden tool.

Further, the above-described use method of the garden tool, further comprises the following steps: when in the storage position, operating the second rod to trigger the actuator, to release the lock engagement of the locking component and the main body of the garden tool; operating the first rod to rotate to the in-use position; releasing the second rod to release the actuator, to enable the lock engagement of the locking component and the main body of the garden tool; drawing out the second rod from the first rod.

On the premise of no increase in parts cost, the present invention realizes the unlock of the locking component through pressing downwardly the second rod, so as to realize the rod mechanism's switch between the storage position and the in-use position, and realizes simplified operation and convenient packing, that is good for cost reduction. In addition, the present disclosure sets a position sensor between the rod mechanism and the lawn mower. Through the action of the position sensor, when the rod mechanism is in the storage position, the power supply circuit is broken to ensure the machine cannot start, prevent the operator from starting the machine by wrong operation, meet safety requirements and the man-machine engineering, and greatly enhance the security.

BRIEF DESCRIPTION OF DRAWINGS

FIG. 2-1 is an overall structure schematic drawing when the rod mechanism of the garden tool of the present disclosure is in the in-use position;

FIG. 2-2 is an overall structure schematic drawing when the rod mechanism of the garden tool of the present disclosure is in the storage position;

DETAILED DESCRIPTION

Figure 1:
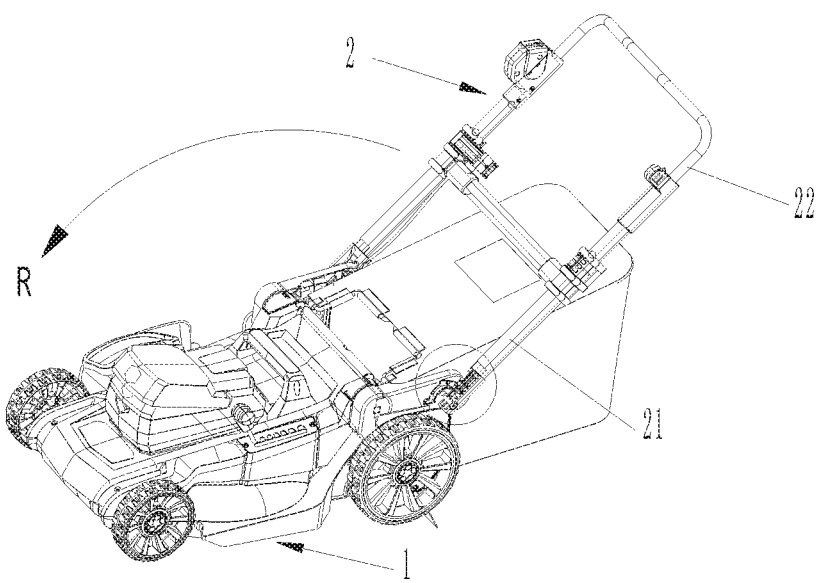
FIG. 1 is a schematic drawing of a garden tool of the present disclosure.
Figures 1, 2:
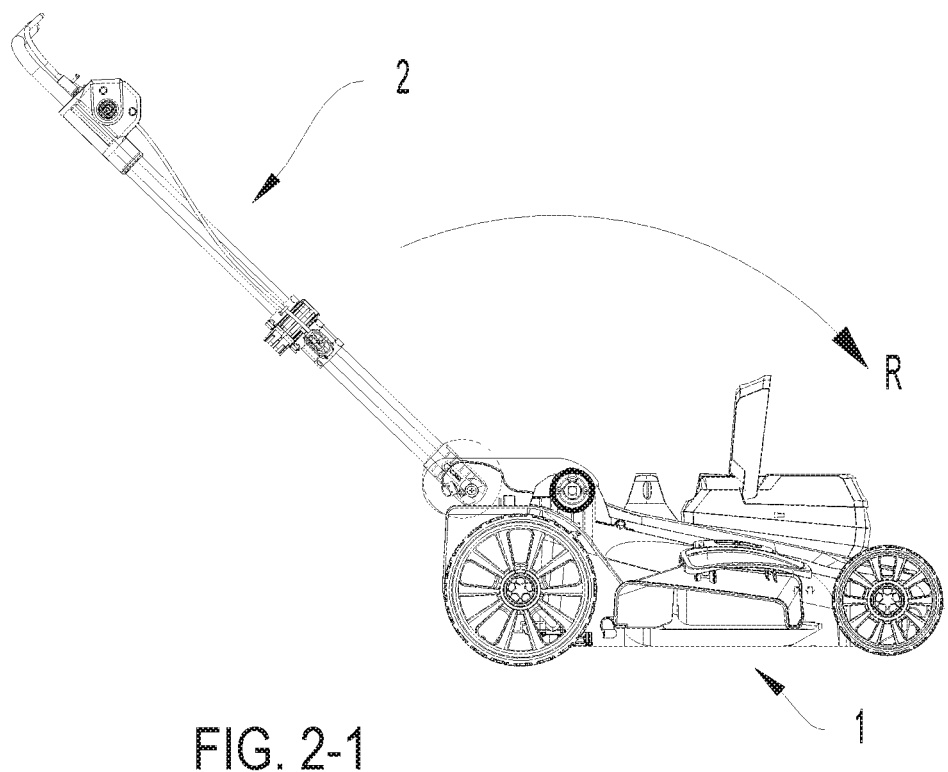
Figure 2:
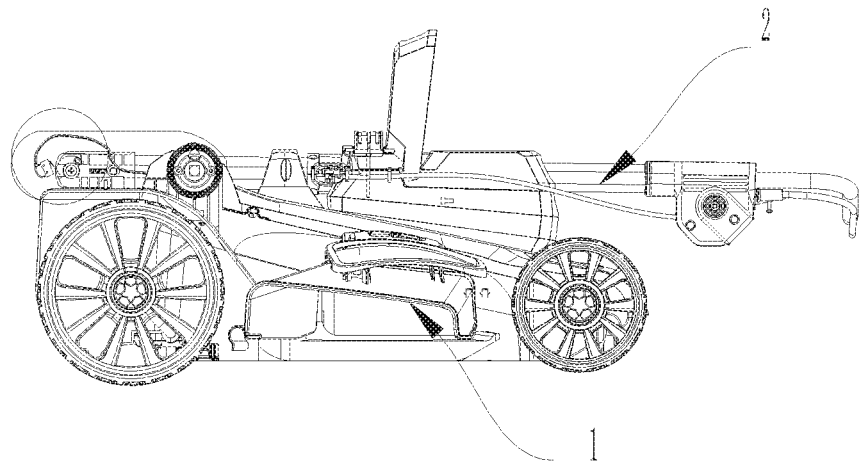
Figure 3:
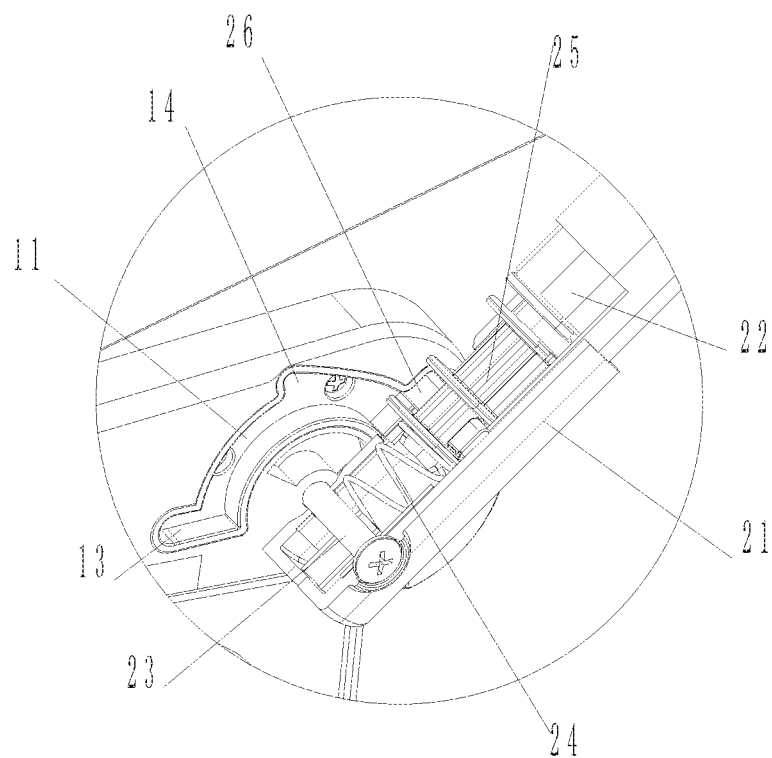
FIG. 3 is a partial enlarged drawing of FIG. 1.

As is shown in FIG. 1, FIG. 2-1, FIG. 2-2 and FIG. 3, the present disclosure provides a rod mechanism for a garden tool. Taking a lawn mower 1 as an example, the rod mechanism 2 includes a first rod 21 and a second rod 22. The second rod 22 is sleeved on the first rod 21 and may slide in the first rod 21. The lower end of the first rod 21 has a rod shaft 23. The first rod 21 is connected at the rear portion of the lawn mower 1 through the rod shaft 23, so that the first rod 21 may rotate around the rod shaft 23, and may be locked at least in the in-use position and/or in the stored position. The first rod 21 comprises an actuator and a locking component. The second rod 22 is configured to trigger or release the actuator when moves to a preset position. Triggering the actuator releases the lock engagement of the locking component and the main body of the lawn mower, and releasing the actuator enables the lock engagement of the locking component and the main body of the lawn mower, that facilitate the locking or rotating of the rod mechanism 2. Of course, the rod mechanism 2 also may be applied to main bodies of any garden tools those need to use rods.

Embodiment 1

Figure 4:
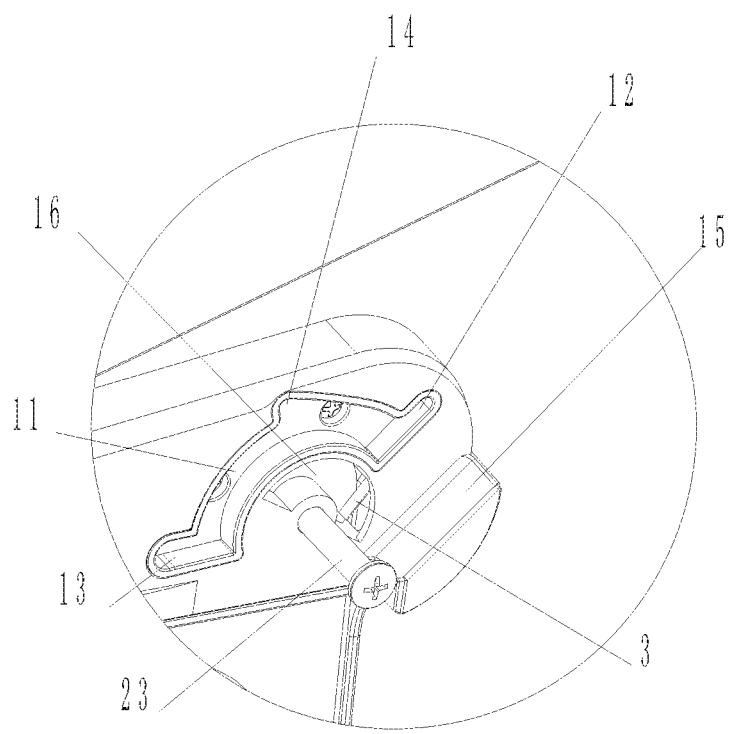
FIG. 4 is a drawing removing the first rod and a second rod of FIG. 3.

As shown in FIG. 3 and FIG. 4, the locking component is configured as a pin 26. The lawn mower 1 has a guiding groove 11 corresponding to the location of the pin 26. The guiding groove 11 has at least a first locking section 12 and a second locking section 13. The actuator includes a first spring 24 and a sliding member 25. The sliding member 25 is disposed within the first rod 21 and located at the bottom of the first rod 21. One end of the pin 26 is connected with the side portion of the sliding member 25, and the other end of the pin 26 extends toward the lawn mower 1 to be received in the guiding groove 11. The guiding groove 11 is configured to limit the motion path of the pin 26. The lower end of the sliding member 25 is connected with the first spring 24. Due to the elastic effect of the first spring 24, in the natural state the first spring 24 exerts an elastic force on the sliding member 25, and makes the sliding member 25 have a tendency to slide upwardly. The sliding member 25 drives the pin 26 to move upwardly, so as to make the pin 26 limited in the locking section. The second rod 22 engages with the top end of the sliding member 25 when being driven to retract into the first rod 21, thus a force in contrary to the first spring 24's elastic force is exerts on the sliding member 25 and makes the sliding member 25 move downwardly along the first rod 21, thereby drives the pin 26 downwardly out of the locking section. Therefore, the pin 26 may have a reciprocating movement along the axial direction of the first rod 21, so as to realize locking or releasing. A second spring is provided to between the pin 26 and the sliding member 25 and make the pin 26 have a tendency to enter into the guiding groove 11.

As shown in FIGS. 2-2 and 4, when the rod mechanism 2 needs to be folded, firstly the second rod 22 is pushed into the first rod 21, the lower end of the second rod 22 pushes the sliding member 25 downwardly that making the pin 26 disengage out of the first locking section 12. The rod mechanism 2 is rotated around the rod shaft 23 along the direction of R, making the pin 26 move within the guiding groove 11. When moves to the position of the second locking section 13, the pin 26 automatically enters into the second locking section 13 under the action of the first spring 24 and is locked in the second locking section 13. The rod mechanism 2 can not rotate anymore around the rod shaft 23. At this point, the rod mechanism 2 is in the storage position that facilitates the storage of the lawn mower 1. As shown in FIG. 2-2, when in the storage position, the rod mechanism 2 is locked, the lawn mower 1 is easy to drag by pulling up the rod mechanism 2 so as to the front portion thereof is lifted and only the rear wheels touches the ground.

As shown in FIG. 2-2 and FIG. 3, when the rod mechanism 2 needs to be unfolded, firstly the second rod 22 is pushed into the first rod 21, the lower end of the second rod 22 pushes the sliding member 25 downwardly that making the pin 26 disengaged out of the second locking section 13.

The rod mechanism 2 is rotated around the rod shaft 23 along the opposite direction of R, making the pin 26 move in the guiding groove 11. When moves to the position of the first locking section 12, under the action of the first spring 24 the pin 26 automatically enters into the first locking section 12 and is locked in the first locking section 12. The rod mechanism 2 can not rotate anymore around the rod shaft 23. At this point, the rod mechanism 2 is in the in-use position, and the lawn mower 1 can be started to work accordingly.

What needs to be explained here is, although there is a pin 26 in FIG. 3, through the pin 26 being limited inside the guiding groove 11, the pin 26 may be used as a separate part connected to the sliding member 25, and may also be integrally formed with the sliding member 25. A projection toward the inside of the guiding groove 11 may also be provided on the sliding member 25. The projection may be integrally formed with the sliding member 25, as long as that the projection may be accommodated in the guiding groove 11 and the volume of the projection is smaller than that of the first locking section 12 and the second locking section 13, and as long as that under the action of the first spring 24 the projection may be limited within the first locking section 12 or the second locking section 13 and come into being a solid connection with the first locking section 12 or the second locking section 13.

Preferably, as shown in FIG. 4, at least one third locking section 14 is provided between the first locking section 12 and the second locking section 13 and defined a transition position in the process of rotation of the rod mechanism 2, that facilitates the rotating of the rod mechanism 2 and simplifies and humanizes the operation. The second spring may be provided between the side of the pin 26 near the first rod 21 and the first rod 21. The second spring is configured to exert a force on the pin 26 and make the pin 26 have a tendency to enter into any one of the first locking section 12, the second locking section 13 or the third locking section 14. A limit portion 15 is additionally provided which is configured to limit the first rod 12. When the rod mechanism 2 is unfolded completely and locked, the first rod 21 and the limit portion 15 contact with each other.

Figure 5:
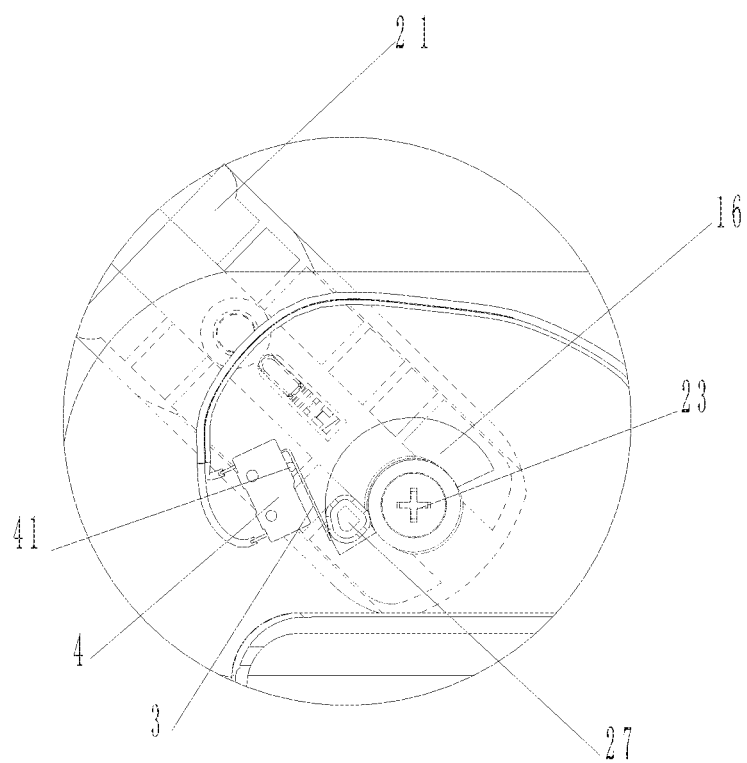
FIG. 5 is a partial enlarged drawing of FIG. 2-1.
Figure 6:
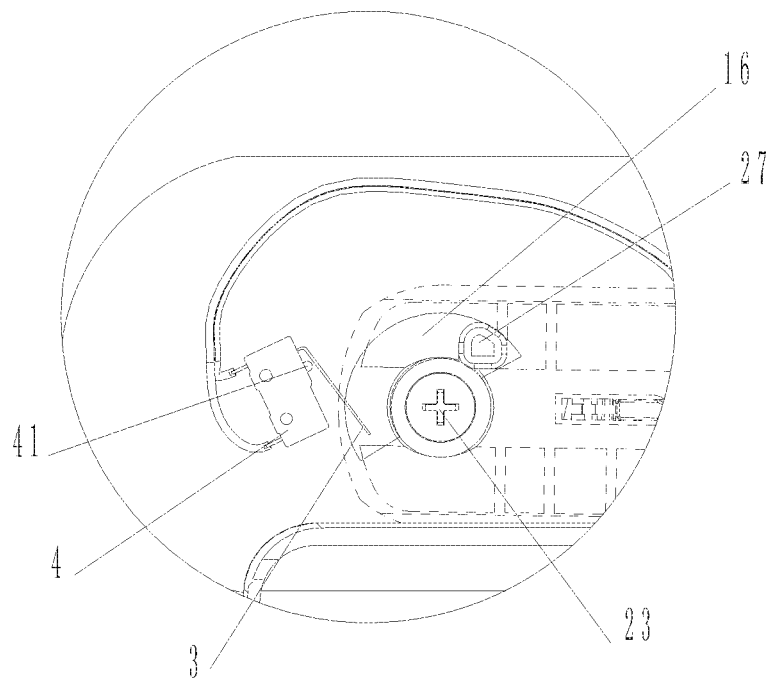
FIG. 6 is a partial enlarged drawing of FIG. 2-2.

As shown in FIG. 5 and FIG. 6, a micro switch 4 and a slot 16 are provided on the lawn mower 1. The micro switch 4 is provided near the rod shaft 23 and includes a switch body, a lever 3 and a contact 41. One end of the lever 3 and the contact 41 are located at an interval on the switch body. The first rod 21 comprises a convex block 27. One end of the convex block 27 is connected to a side portion of the first rod 21 and the other end thereof is accommodated in the slot 16. The slot 16 restricts the motion path of the convex block 27.

As shown in FIG. 1 and FIG. 5, when the first rod 21 moves from the storage position to the in-use position, the lever 3 deforms elastically and engages with the contact 41 due to the convex block 27 contacts and presses the other end of the lever 3. When the lever 3 engages with the contact 41, the micro switch 4 generates a sensing signal, and the whole switch circuit is closed. At this point, if the operator turns on the main switch, the machine starts to complete the corresponding work. As shown in FIG. 2-2 and FIG. 6, when the first rod 21 moves from the in-use position to the storage position, the convex block 27 moves away from the lever 3 together with the rod mechanism 2, so as to the sensing signal is not generated and the whole switch circuit is open. At this point, even if the operator turns on the main switch, the machine does not start and the operator's safety is ensured. The micro switch 4 is only a preferred solution and may be replaced by other position sensors, as long as the position sensor is triggered to generate a sensing signal to complete actions accordingly when the rod mechanism 2 moves to the in-use and/or storage position.

What needs to be explained is, the above-described installment of the micro switch 4 at the in-use position of the rod mechanism 2 is only a preferred solution, and the micro switch 4 may also be installed at the storage position of the rod mechanism 2. A controller is provided on the lawn mower 1, to which the micro switch 4 is electrically connected. At this point, when the rod mechanism 2 moves to the storage position, the lever 3 deforms elastically and engages with the contact 41 due to the convex block 27 contacts and presses the lever 3. When the lever 3 engages with the contact 41, the micro switch 4 generates a sensing signal. After receiving the sensing signal, the controller controls to disconnect the whole switch circuit. Even the main switch is turned on, the machine doesn't start, that prevents the lawn mower 1 from starting when in the storage position and increases security. Of course, a means of analog circuit may be instead of the controller and implemented to realize the disconnection of the whole switch circuit when the micro switch 4 generates the sensing signal. What needs to be considered is, of course, and so on, the micro switch 4 may be installed at both the in-use position and the storage position, the working process of which may refer to the above and is no longer described in unnecessary details here.

Embodiment 2

Figure 7:
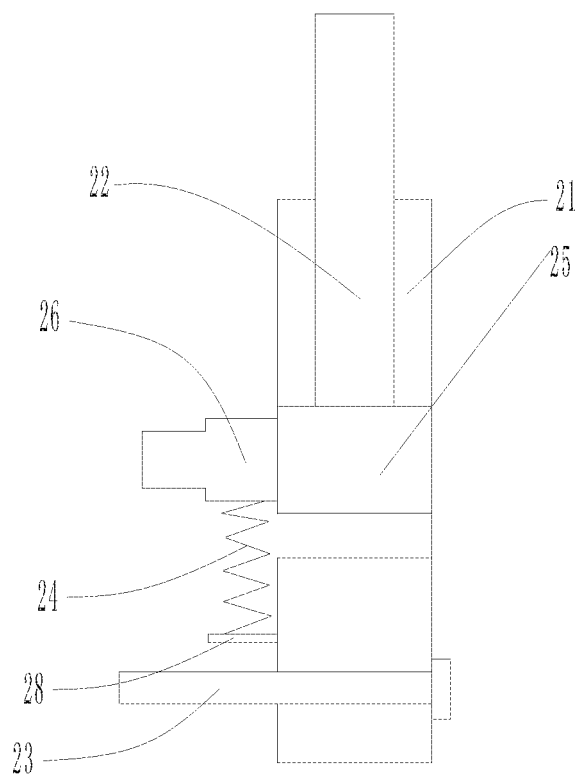
FIG. 7 is a structure schematic drawing of a second embodiment of the disclosure.

As is shown in FIG. 3 and FIG. 7, a baffle 28 is provided on a side portion of the first rod 21 and below the pin 26. The first spring 24 is provided between the baffle 28 and the pin 26. An upward elastic force exerted by the first spring 24 make the pin 26 an upwardly moving tendency and enter into the locking section. Through the second rod 22 applying a force on the sliding member 25 to push the sliding member 25 downwardly, the sliding member 25 drives the pin 26 out of the locking section. Rotating the rod mechanism 2 around the rod shaft 23 may move the rod mechanism 2 to the storage position or the in-use position.

Embodiment 3

The present disclosure also provides a use method of the garden tool of the above-described embodiments, comprising the following steps:

Step S1, when in the in-use position, driving the second rod 22 to retract into the first rod 21 until contacting with the actuator;

Step S2, operating the second rod 22 to trigger the actuator to release the lock engagement of the locking component and the main body of the garden tool;

Step S3, operating the first rod 21 to rotate to the storage position;

Step S4, releasing the second rod 22 to release the actuator, to enable the lock engagement of the locking component and the main body of the garden tool.

Further, the above-described use method of the garden tool also comprises the following steps:

Step S5, when in the storage position, operating the second rod 22 to trigger the actuator, to release the lock engagement of the locking component and the main body of the garden tool;

Step S6, operating the first rod 21 to rotate to the in-use position;

Step S7, releasing the second rod 22 to release the actuator, to enable the lock engagement of the locking component and the main body of the garden tool;

Step S8, drawing out the second rod 22 from the first rod 21.

It can be found through the above description that on the premise of no increase in parts cost, the present disclosure realizes the unlock of the locking component through pressing downwardly the second rod, so as to realize the rod mechanism's switch between the storage position and the in-use position, and realizes simplified operation and convenient packing, that is good for cost reduction. In addition, the present disclosure sets a position sensor between the rod mechanism and the lawn mower. Through the action of the position sensor, when the rod mechanism is in the storage position, the power supply circuit is break that ensures the machine cannot start, prevents the operator from starting the machine by wrong operation, meets safety requirements and the man-machine engineering and greatly enhances the security.

The invention claimed is:

1. A rod mechanism for a garden tool having a main body, the rod mechanism comprising:
   a first rod pivotally connected to the main body and movable between an in-use position and a storage position relative to the main body;
   a locking component for engaging the main body to lock the first rod in one of the in-use position and the storage position;
   an actuator movable between a released position and a triggered position, the actuator when in the triggered position unlocking the locking component from the main body, the actuator when in the released position orienting the locking component so as to be lockable to the main body;
   a second rod movably connected to the first rod, movement of the second rod to a preset position allowing the actuator to move to one of the triggered position or the released position, the second rod configured to be retractable into the first rod when moving to the preset position; and
   a position sensor on the main body configured to generate a sensing signal when the first rod pivots to at least one of the in-use position and the storage position.

2. The rod mechanism according to claim 1, wherein the actuator includes an elastic member and a sliding member, the elastic member being connected to a lower end of the sliding member for urging the sliding member in an upward direction, one end of the locking component being connected to the sliding member, another end of the locking component extending toward the main body, the second rod abutting an upper end of the sliding member when moving to the present position.

3. The rod mechanism according to claim 2, wherein the locking component includes a pin, the pin extending through the sliding member and toward the main body.

4. The rod mechanism according to claim 2, wherein the actuator comprises an elastic member and a sliding member, one end of the locking component being connected to the sliding member, another end of the locking component extending toward the main body, the first rod having a baffle located below the locking component, the elastic member being connected between the locking component and the baffle for urging the locking component in an upward direction.

5. The rod mechanism according to claim 2, wherein the main body of defines a guiding groove along a direction of rotation of the first rod relative to the main body, the guiding groove including a guiding portion and at least two locking sections communicating with the guiding portion, the locking component having an end extending toward the main body inside the guiding groove, the end held in one of the locking sections when the locking component is in a lock engagement state with the actuator in the released position, the end entering the guiding portion from the locking section when the locking component is out of the lock engagement state with the actuator in the triggered position, the first locking section being located at a head end of the guiding groove, and the second locking section being located at a terminal end of the guiding groove.

6. The rod mechanism according to claim 5, wherein the guiding groove includes a third locking section positioned between the first locking section and the second locking section.

7. The rod mechanism according to claim 1, wherein the position sensor includes a micro switch, and the first rod has a convex block, the convex block contacting the micro switch to generate the sensing signal when the first rod is rotated to one of the in-use position and the storage position.

8. The rod mechanism according to claim 7, wherein the micro switch includes a switch body, a lever and a contact, the lever and the contact being located at a location on the switch body whereby when the first rod is rotated to the in-use position, the convex block engages with the lever and presses the lever to deform so as to engage the contact to thereby generate the sensing signal.

9. A garden tool including the main body and the rod mechanism according to claim 1.

10. A method of using a garden tool according to claim 9, the method comprising the steps of:
    with the first rod in the in-use position, retracting the second rod into the first rod to move the actuator to the triggered position to unlock the locking component from the main body;
    pivoting the first rod from the in-use position to the storage position; and
    releasing the second rod to move the actuator to the released position to enable the locking component to lock to the main body.

11. The method according to claim 10, further comprising the steps of:
    with the first rod in the storage position, retracting the second rod into the first rod to move the actuator to the triggered position to unlock the locking component from the main body;
    pivoting the first rod from the storage position to the in-use position;
    releasing the second rod to move the actuator to the released position to enable the locking component lock the main body; and
    drawing out the second rod from the first rod.

* * * * *